FREDERICK ROSKY
CARL P. WENZEL
INVENTORS

BY John R. Faulkner
Clifford L. Sadler
ATTORNEYS

July 20, 1965  F. ROSKY ETAL  3,195,878
AUTOMOTIVE SUSPENSION SYSTEM HAVING A DUAL STAGE SPRING MEANS
Filed Dec. 18, 1963  2 Sheets-Sheet 2

FREDERICK ROSKY
CARL P. WENZEL
INVENTORS

BY John R. Faulkner
Clifford L. Sadler
ATTORNEYS

United States Patent Office 3,195,878
Patented July 20, 1965

3,195,878
AUTOMOTIVE SUSPENSION SYSTEM HAVING
A DUAL STAGE SPRING MEANS
Frederick Rosky, Dearborn, and Carl P. Wenzel, Garden
City, Mich., assignors to Ford Motor Company, Dearborn, Mich., a corporation of Delaware
Filed Dec. 18, 1963, Ser. No. 331,989
10 Claims. (Cl. 267—67)

This invention relates to an automotive suspension system that reduces harshness by permitting resilient fore-and-aft movement of the road wheels and more particularly to an automotive suspension that incorporates a dual stage spring means for controlling this movement.

This application is a continuation-in-part of copending application Serial No. 137,759, filed on September 13, 1961, now abandoned.

Automotive suspension systems have been designed to eliminate the ride harshness resulting from undamped horizontal forces exerted at the road wheels. These suspension systems permit the wheels to recede slightly in a horizontal direction when road shocks having horizontal force components are encountered. This type of suspension system requires some form of spring means to resist the horizontal wheel recession and return the wheel to its normal, equilibrium position after the horizontal force is removed.

The magnitude of horizontal forces encountered at each wheel varies greatly during the operation of the vehicle. The tar expansion strips utilized in road construction exert a repetitive force of small magnitude. The horizontal force caused by the tar strips, because of the frequency with which they are encountered, can create a continual thumping sensation. This annoying sensation can be overcome by allowing the wheel to recede slightly in a horizontal direction every time a tar strip is encountered. Wheel shudder or shake may result, however, if the horizontal wheel recession is not limited during rapid braking or acceleration.

Therefore, a centering spring means must be incorporated in the automotive suspension system that permits horizontal wheel recession at light loads but prevents excessive recession under extreme conditions. A single constant rate centering spring cannot effectively perform both of these functions.

It is one of the principal objects of this invention to provide an improved automotive suspension system that permits controlled horizontal wheel recession to reduce ride harshness.

A further object of this invention is the provision of a dual stage centering spring means to control both low and high load horizontal wheel deflections.

It is a further object of this invention to provide for a dual stage centering spring means in a suspension system that offers a lesser degree of resistance in initial horizontal wheel deflection and a greater degree of resistance to increased horizontal wheel deflection.

A still further object of this invention is to provide a dual stage centering spring means for a suspension system that will return the wheel to its normal equilibrium position after the horizontal forces acting upon the wheel have been removed.

In an automotive suspension system embodying the present invention, the road wheel is supported for both horizontal and vertical movement relative to the chassis of the vehicle. A dual stage centering spring means is interposed between each wheel and the chassis. The dual stage centering spring means operates in a first stage in which the wheel is permitted to recede slightly in a horizontal direction under low magnitude loads. The second stage of operation offers an increasing rate of resistance to wheel deflection as higher magnitude loads are encountered.

Further objects and advantages of this invention will become more obvious as this description proceeds, particularly when considered in conjunction with the accompanying drawings, wherein.

Figure 1:
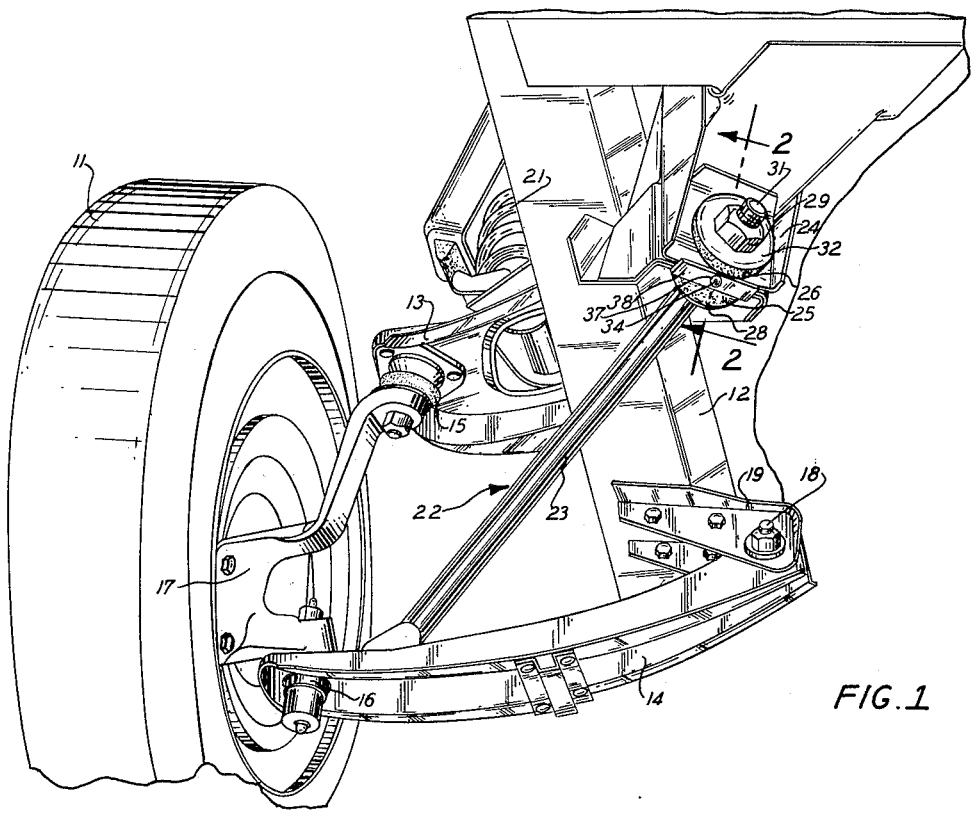
FIGURE 1 is a view of a front portion of the motor vehicle depicting the suspension system incorporating the dual stage centering spring means of the present invention.

Referring now to the drawings and in particular to FIGURE 1, an automotive independent front wheel suspension is shown. In the illustrated construction, a wheel 11 is suspended for movement relative to a chassis member 12 by an upper control arm 13 and a lower control arm 14. At the outer ends of the control arms 13 and 14, upper and lower ball joint assemblies 15 and 16, respectively, support a wheel spindle 17. The wheel 11 is rotatably mounted on the spindle 17.

The control arms 13 and 14 are pivoted at their inboard ends on the chassis member 12 to allow movement of the wheel 11 and the spindle 17 when road shocks are encountered. The pivotal connections for the upper control arm 13 are conventional and not shown. The lower control arm 14 is pivotally supported on a pivot pin 18 that is affixed to a frame bracket 19. The frame bracket 19 is welded or riveted to the chassis member 12. Vertical wheel shocks are isolated from the passengers by a spring and a viscous shock absorber assembly indicated generally at 21. The spring and shock absorber 21 are connected between the upper arm 13 and the vehicle chassis in a known manner.

The lower control arm 14 is suspended on the pivot pin 18 in a manner to permit slight pivotal movement in a horizontal direction in addition to its normal vertical pivotal movement. For this purpose, a resilient bushing (not shown) is interposed between the arm 14 and the pivot pin 18. When the wheel 11 encounters an obstacle, the horizontal component of the force will cause the lower control arm 14 to move slightly in a rearward direction by deformation of the rubber bushing. Thus, the wheel 11 will be allowed to recede slightly.

A drag strut assembly indicated generally at 22 is interposed between the lower control arm 14 and the chassis member 12 to control the rate of wheel recession and to return the lower control arm 14 to its normal position once the horizontal force acting thereupon is removed. The drag strut assembly 22, in addition, resists movement of the wheel 11 relative to the chassis member 12 during severe acceleration or deceleration of the vehicle.

The drag strut assembly 22 includes a forge strut 23 that is secured at its rearward end to the lower control arm 14. The forward end of the strut 23 is supported by a bracket 24 that is welded or riveted to the chassis member 12. The connection between the strut 23 and the bracket 24 may be best understood by reference to FIGURE 2.

The strut 23 is supported in the bracket 24 by a dual stage centering spring means generally designated as 20 that tends to center the strut 23 and the wheel 11 as well as resist horizontal wheel deflection. For this purpose, an aperture is formed in the bracket 24 through which the strut 23 extends. Generally doughnut-shaped, resilient pucks 25 and 26 are positioned on each side of the bracket 24 around the strut 23. The pucks 25 and 26 shown in FIGURE 2 have a very low rate initially as they may be formed from a cellular rubberlike material. As they are further compressed, their spring rate rapidly increases to the maximum rating.

The puck 25 is contained between a shoulder 27 formed on the strut 23 and the bracket 24. A washer 28 distributes the pressure applied on the puck 25 equally over its surface. The puck 26 is contained between the other side of the bracket 24 and a nut 29 positioned on a threaded end 31 of the strut 23. A washer 32 distributes the load over the face of the puck 26.

Figure 2:
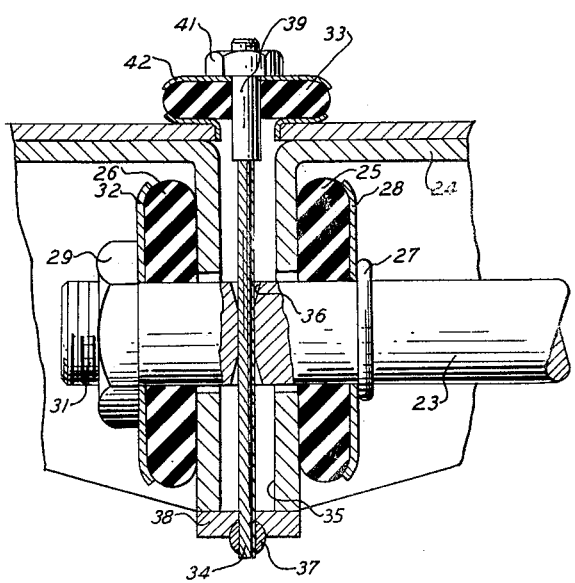
FIGURE 2 is a cross sectional view of the dual stage centering spring means taken along line 2—2 of FIGURE 1.

The pucks 25 and 26 shown in FIGURE 2 are not preloaded. Thus, they provide no control or little control, which is inconsequential, over initial wheel deflection. The rate of initial deflection of the wheel 11 is controlled by a resilient puck 33 positioned above the bracket 24. Loads are transmitted from the strut 23 to the puck 33 by a cable 34 contained in a cavity 35 formed in the bracket 24. The cable 34 passes through a chamfered hole 36 formed in the strut 23. The lower end of the cable 34 is secured by a ball 37 to a plate 38 which forms a part of the bracket 24. The upper end of the cable 34 is rigidly secured to a threaded cylindrical member 39 which passes through an aperture formed in the puck 33. A nut 41 threaded on the cylindrical member 39 determines the preload on the puck 33 and the initial tension in the cable 34. A washer 42 equalizes the load over the face of the puck 33.

Figure 3:
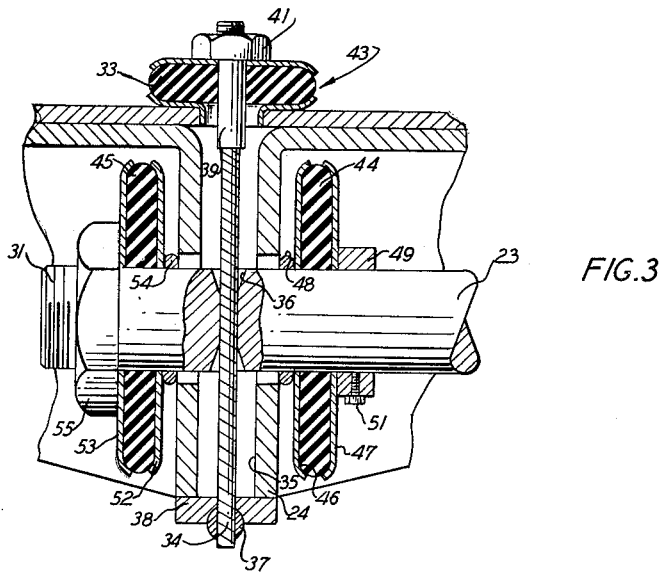
FIGURE 3 is a cross sectional view of an alternate embodiment of the dual stage centering spring means; and, FIGURE 4 is a cross sectional view of a further embodiment of the dual stage centering spring means.

A further embodiment of a dual stage centering spring means, generally designated as 43, is shown in FIGURE 3.

In this embodiment, two doughnut-shaped pucks 44 and 45 are positioned on opposite sides of the bracket 24. Puck 44 is interposed between washers 46 and 47. A shoulder 48, which is formed on the strut 23, abuts washer 46. A bushing 49 encompasses the strut 23 inward of the dual stage centering spring means 43. This bushing 49 may be slid along the strut 23 until it abuts washer 47. A set screw 51 can then be tightened to hold the bushing 49 on the strut 23 and in abutment with the washer 47.

Puck 45 is also interposed between two washers 52 and 53. These washers 52 and 53 on each side of the puck 45 are contained by a shoulder 54 and a nut 55 received on the threaded end 31 of the strut 23.

Both shoulders 48 and 54 are smaller in diameter than the aperture formed in the bracket 24 through which the strut 23 extends.

During axial movement of the strut 23, shoulders 48 and 54 will clear the bracket 24 so that no restraining force on the part of the pucks 44 and 45 will result until either washer 46 or 52 engages the respective outside surface of the bracket 24.

The nut 55 can be tightened to preload the puck 45 to a desired level. The washer 52 will distribute the load evenly over the entire face of the puck 45. Bushing 49 can also be moved against the washer 47 to compress the puck 44 before the set screw 51 is tightened so as to preload puck 44.

It can be readily understood that the pucks 44 and 45 do not contact the bracket 24 during initial deflection of the road wheel 11. Only when forces of substantial magnitude are encountered by the road wheel 11 resulting in severe axial movement of the strut 23, will puck 44 or 45 be compressed to offer a higher degree of resistance to these forces. The amount of preloading of the pucks 44 and 45 will establish the degree of resistance to excessive wheel recession.

The rate of initial deflection of the wheel 11 is controlled by the resilient puck 33 as heretofore described.

Figure 4:
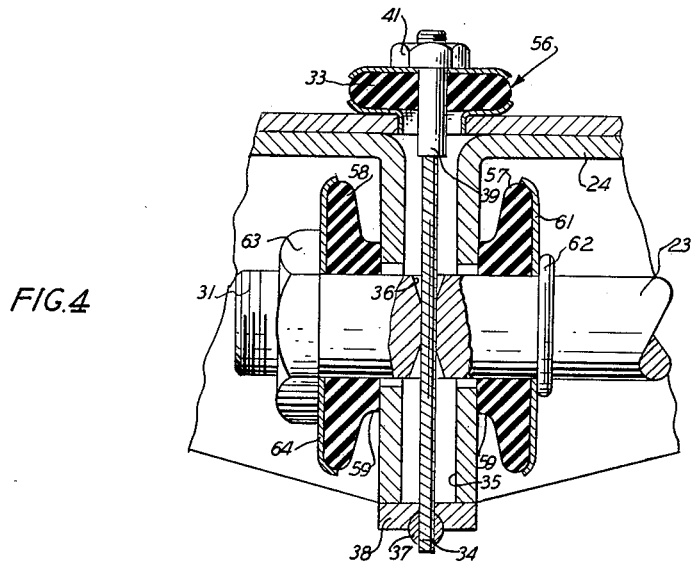

In FIGURE 4 is seen a further embodiment of a dual stage centering spring means of this invention, generally designated as 56. In this embodiment, generally doughnut-shaped pucks 57 and 58 are positioned on the strut 23 on opposite sides of the bracket 24. The pucks 57 and 58 are of a special configuration and have select spring rate properties. Each puck has an annular cylindrical portion 59 of a relatively short length on one side. One end face of each puck extends from this portion 59 to the outside diameter in a diagonal plane while the other end face is disposed in a vertical plane when the pucks are mounted on the strut 23. The puck 57 is placed on the strut 23 so that the end face of the cylindrical portion 59 abuts one side of the bracket 24. A washer 61 is placed in abutment with the other end face of the puck 57. A shoulder 62, which is formed on the strut 23, retains the puck 57 on the strut 23.

Puck 58 has the end face of its cylindrical portion 59 abutting the other side of the bracket 24. A nut 63 is positioned on the threaded end 31 of the strut 23. A washer 64 is disposed between the puck 58 and the nut 63 so as to distribute the load over the end face of the puck 58.

The specific configuration of pucks 57 and 58 provides for a variable spring rate. During initial wheel deflection, the annular cylindrical portion 59 of the respective pucks will be compressed to provide a very low uniform spring rate which is inconsequential in providing control during initial wheel recession of a low magnitude. As forces of greater magnitude act on the wheel, the inner end face of each puck will be gradually forced into engagement with the respective surface of the bracket 24. During acceleration and deceleration of the vehicle, maximum compression of each puck is effected to provide a high degree of resistance to continued movement of the strut 23. The resilient puck 33 positioned above the bracket 24 through its interconnected cable 34 will provide control for initial wheel deflection.

*Operation*

In the embodiment shown in FIGURES 1 and 2, it can be readily seen that the wheel 11 is displaced slightly in a horizontal direction when the wheel meets an obstacle in the road that exerts a force having a horizontal component. This is accompanied by the pivotal movement of the lower arm 14 in a horizontal direction and axial movement of the strut 23. The movement of the strut 23 tends to compress the resilient pucks 26 and 33. During initial deflection, the puck 26 is only very slightly compressed due to its cellular structure. The initial movement causes flexible cable 34 to be deflected to cause the cylindrical member 39 to be drawn downward into the cavity 35. This exerts a compressive force on the puck 33. If the force exerted on the wheel 11 is sufficient to cause deflection of a greater magnitude, the puck 26 will be additionally compressed to provide a very high degree of spring resistance. Once the horizontal force is removed, the cable 34 will return to its vertical position quickly to allow puck 26 to return to its vertical position quickly due to the expansion of puck 33. This will result in the strut 23 and the lower arm 14 to be returned to their original position to center the wheel 11. Pucks 25 and 26 will also expand to return to their original and free size.

The cable 34 does not elongate under wheel deflection but merely is drawn downward into the cavity 35 in order to load the puck 33. The chamfer of the hole 36 permits recession without creating localized stresses on the cable 34. In addition, the chamfer permits the strut 23 to pivot in a vertical direction allowing the vertical movement of the wheel 11 without offering any resistance thereto.

The rate of initial wheel deflection is controlled by the amount of preload exerted upon the puck 33 by the nut 41. Puck 33 has to be of a sufficient high rate to permit the flexed cable to return to its vertical position quickly to center the wheel after the longitudinal forces acting thereupon have been removed.

The puck 33 will be continued to be compressed as axial movement of the strut 23 is increased. Thus, puck 33 provides an increasing degree of resistance to forces of large magnitude, but these forces acting on the wheel during sudden acceleration and deceleration of the vehicle are so great that the puck 33 or the cable 34 may fail. Pucks 25 and 26, which possess a relatively high rate after being compressed, come into play after initial wheel deflection. Thus, the rearward deflection under severe loading is mostly controlled by puck 26 and forward deflection by puck 25. Also, puck 33 contributes its spring rate to effect a high degree of resistance to horizontal forces of substantial magnitude acting on the wheel 11.

As the pucks 25 and 26 of the first embodiment are of a cellular construction, they only provide a very low spring rate during initial wheel deflection so that puck 33 practically controls the entire amount of wheel deflection under light loads.

In FIGURE 3, the pucks 44 and 45 are mounted so as to provide a lost motion arrangement. Thus, pucks 44 and 45 do not contribute any spring rate during initial wheel deflection. As pucks 44 and 45 are preloaded and are of a high spring rate, they mostly control wheel deflection caused by horizontal forces of great magnitude acting on the wheel.

The pucks 57 and 58 shown in FIGURE 4 are designed to contribute a very low constant spring rate during initial wheel deflection, and thus most of the initial load is carried by puck 33. As continued movement of the strut 23 occurs, pucks 57 and 58 contribute an increasingly higher spring rate to control severe loading of the suspension members.

It can be readily understood that horizontally disposed puck 33 provides most of the spring resistance to wheel deflection during initial horizontal wheel movement. The vertically disposed pucks mounted on the strut 23 effect a substantial or high degree of spring resistance to wheel deflection under increased loads, especially under extreme load conditions encountered during deceleration or acceleration of the vehicle. This creates a two stage spring effect.

Puck 33 is of a sufficient high rate to permit the flexed cable 34 to return quickly to its vertical position to assure centering the wheel in its normal, equilibrium position after the horizontal forces acting thereupon are removed. The vertically disposed pucks mounted on the strut do not provide this centering feature. By adjusting the preload on and varying the rate of the various pucks, the exact ride characteristics desired may be achieved.

It is to be understood that the construction shown and described is exemplary only of the specific form of the invention. Various changes and modifications may be made without departing from the invention. For example, chassis member 12 may be either a portion of the frame of a conventional frame-type vehicle or a suitable structural member of a unitized vehicle. The dual stage centering spring means of this invention can be operatively interposed between any sprung and unsprung components of a vehicle. This invention is not limited to the type of independent suspension system shown but may be incorporated in the mounting structure of any member disposed between sprung and unsprung components. In addition, the spring means need not be the resilient pucks illustrated but may be coil or other type springs. Various other changes and modifications may be made without departing from the spirit and scope of the invention as defined by the appended claims.

What is claimed as new is:

1. An automotive suspension system comprising a sprung member, an unsprung member, and suspension means supporting said unsprung member for vertical and horizontal movement relative to said sprung member, said suspension means including a unitary dual stage spring means, said dual stage spring means comprising a first spring means and a second spring means, only said first spring means being operative during initial horizontal movement of said unsprung member to provide a relatively low degree of resistance to movement caused by horizontal forces of low magnitude acting on said unsprung member, said first and second spring means being operative to provide an increasing degree of resistance to continued movement due to horizontal forces of larger magnitude acting on said unsprung member.

2. An automotive suspension system comprising a chassis member, a road wheel, means including a suspension arm supporting said road wheel on said chassis member for vertical and horizontal movement, dual stage centering spring means operatively interposed between said suspension arm and said chassis member, said dual stage centering spring means comprising a first centering spring means and a second spring means, only said first centering spring means being operative during initial horizontal movement of said road wheel to provide a relatively low degree of resistance to horizontal forces of low magnitude acting on said road wheel, said first centering spring means and said second spring means being operative during continued movement of said road wheel to provide an increasing high degree of resistance to horizontal forces of large magnitude acting on said road wheel, said first centering spring means returning said road wheel to its original position upon removal of said horizontal forces acting thereupon.

3. An automotive suspension system comprising a sprung member, an unsprung member, suspension means supporting said unsprung member for vertical and horizontal movement relative to said sprung member, a unitary dual stage centering spring means attached to said sprung member, said dual stage centering spring means comprising a first centering spring means and a second spring means, force applying means operative to transmit horizontal forces acting on said unsprung member to said dual stage centering spring means, said dual stage centering spring means also including a motion translating means operative to translate movement of said force applying means due to horizontal forces acting on said unsprung member into the loading of said first centering spring means, said first centering spring means being operative during initial horizontal movement of said unsprung member to provide a relatively low degree of resistance to such movement, said first centering spring means and said second spring means being operative during continued horizontal movement of said unsprung member to provide an increasing high degree of resistance to such movement, said first centering spring means returning said unsprung member to its original position upon the removal of forces acting thereupon.

4. An automotive suspension system comprising a chassis member, a road wheel, suspension means including a suspension arm supporting said road wheel on said chassis member for vertical and horizontal movement, a dual stage spring means carried by said chassis member, a strut interconnecting said suspension arm with said dual stage spring means, said dual stage spring means comprising a first spring means and a second spring means, said strut being operative to transmit movement of said road wheel in a horizontal direction caused by horizontal forces acting thereupon, the initial movement of said road wheel due to horizontal forces of low magnitude acting on said road wheel loading only said first spring means to provide a relatively low degree of resistance to such forces, further continued movement of said strut due to horizontal forces of larger magnitude acting on said road wheel loading said first spring means and said second spring means, said first spring means and said second spring means upon being loaded providing a large degree of resistance to such continued movement.

5. An automotive suspension system comprising a chassis member, a road wheel, means including a suspension arm supporting said road wheel on said chassis member for vertical and horizontal movement, a dual stage spring means carried by said chassis member, a strut interconnecting said dual stage spring means with said suspension arm to transmit horizontal forces acting on said road wheel to said dual stage spring means, said dual stage spring means comprising a first centering spring means, a second spring means, and a motion translating means operative to translate movement of said strut into loading of said first centering spring means, said first centering spring means being operative during initial horizontal movement of said strut due to horizontal forces of low magnitude acting upon said road wheel to provide a relatively low degree of resistance to such movement, said first centering spring means and said second spring means being operative during continued horizontal movement due to horizontal forces of large magnitude acting upon said road wheel to provide a relatively increasing high degree of resistance to such continued movement, said first centering spring means centering said road wheel in its original position upon the removal of horizontal forces acting thereupon.

6. An automotive suspension system comprising a chassis member, a road wheel, means including a suspension arm supporting said road wheel on said chassis member for vertical and horizontal movement, a dual stage spring means carried by a bracket attached to said chassis member, and a diagonally extending strut connecting said suspension arm with said dual stage spring means to transmit horizontal forces encountered by said road wheel to said dual stage spring means, one end of said strut extending through said bracket, said dual stage spring means comprising a cable having one end attached to said bracket and extending through an opening in said strut, a first spring means interposed between the other end of said cable and said bracket, and a second spring means mounted on said strut and abutting said bracket, said cable being flexed to translate movement of said strut into loading of said first spring means, said first spring means being loaded by said cable upon initial movement of said strut caused by horizontal forces of low magnitude acting upon said road wheel to provide a relatively low degree of resistance to said initial movement, said first spring means and said second spring means being loaded during continuous movement of said strut caused by horizontal forces of larger magnitude acting on said road wheels to provide a high degree of resistance to such continued movement, said flexed cable being returned to its normal position by said first spring means upon the removal of the horizontal forces acting upon said road wheel to center the latter.

7. The automotive suspension system as described in claim 6 and which is further characterized in that said first spring means has a relatively high spring rate and said second spring means has a very low initial spring rate and an increasingly higher spring rate upon being further compressed.

8. The automotive suspension system as described in claim 7 and which is further characterized in that said first and second spring means are compressible rubber pucks.

9. An automotive suspension system comprising a chassis member, a road wheel, means including a suspension arm supporting said road wheel on said chassis member for vertical and horizontal movement, a dual stage spring means carried by a bracket attached to said chassis member, and a diagonally extending strut connecting said suspension arm with said dual stage spring means to transmit horizontal forces encountered by said road wheel to said dual stage spring means, one end of said strut extending through said bracket, said dual stage spring means comprising a cable having one end attached to said bracket and extending through an opening in said strut, a first spring means interposed between the other end of said cable and said bracket, and a second spring means nonmovably mounted on said strut and spaced from said bracket, said cable being flexed to translate movement of said strut into loading of said first spring means, said first spring means being partially loaded by said cable upon initial movement of said strut caused by horizontal forces of low magnitude acting on said road wheel to provide a relatively low degree of resistance to said initial movement, said first spring means being increasingly loaded by said cable during continued movement of said strut, said second spring means being compressed by said bracket during continued movement of said strut, said first and second spring means providing a high degree of resistance to such continued movement of said strut to provide a high degree of resistance to such movement, said flexed cable being returned to its normal position by said first spring means upon removal of horizontal forces acting upon said road wheel to center the latter.

10. The automotive suspension system as described in claim 9 and which is further characterized in that said first spring means has a relatively high rate and said second spring means is preloaded to provide a high spring rate upon being compressed.

References Cited by the Examiner

UNITED STATES PATENTS

| 1,546,759 | 7/25 | Silver | 267—67 |
| 2,972,489 | 2/61 | Collier | 267—20 X |

FOREIGN PATENTS

| 922,272 | 1/55 | Germany. | |

PHILIP ARNOLD, *Primary Examiner.*

A. HARRY LEVY, *Examiner.*